United States Patent [19]
Connelly

[11] Patent Number: 5,503,177
[45] Date of Patent: Apr. 2, 1996

[54] REPAIR DEVICE FOR FLUID DISTRIBUTION VALVES

[75] Inventor: Kevin M. Connelly, Cayuga, N.Y.

[73] Assignee: New York State Electric & Gas Corp., Binghamton, N.Y.

[21] Appl. No.: 349,583

[22] Filed: Dec. 5, 1994

[51] Int. Cl.⁶ .................................................. F16K 43/00
[52] U.S. Cl. ..................... 137/15; 29/402.09; 29/402.12; 29/890.121; 137/315; 251/284; 251/286
[58] Field of Search ........................... 29/402.02, 402.04, 29/402.08, 402.09, 401.11, 402.12, 402.15, 890.121; 137/15, 315; 251/284, 286, 288

[56] References Cited

U.S. PATENT DOCUMENTS

| | | | |
|---|---|---|---|
| 2,373,020 | 4/1945 | Doster | 137/315 |
| 3,047,007 | 7/1962 | Lunken | 137/315 |
| 4,152,905 | 5/1979 | Lippay | 29/402.09 |
| 4,161,958 | 7/1979 | Behle | 29/890.121 |

Primary Examiner—George L. Walton
Attorney, Agent, or Firm—Salzman & Levy

[57] ABSTRACT

The present invention features a retrofit, stop replacement device for the repair of damaged, rusted or corroded stop limits or abutments of distribution valves. The repair device is made up of a guide plate that fits over the facial portion of the distribution valve. Included in this guide plate is a replacement stop for the damaged, rusted or corroded stop abutment. This device is designed to be a one-piece unit. The guide plate is also made up of two inverted, U-shaped guide members that are positioned over the surface ribs of the distribution valve. The inverted, U-shaped guide members are held in place by their respective surface ribs. The ribs, via the inverted, U-shaped guide members, prevent the guide plate from being twisted when the rotatable valve abutment comes into contact with the stop abutment. The guide plate also includes at least one flange mounting bracket that is an integral part of the guide plate. The flange mounting bracket(s) fit flush upon the respective flange portions of the distribution valve. The respective flange mounting brackets are bolted to the flange portion by hexagonal stud bolts through stud holes that align with the bolt holes in the respective flange portion. Fastening the flange mounting brackets to the flange portion anchors the guide plate securely to the distribution valve.

15 Claims, 11 Drawing Sheets 5,503,177

REPAIR DEVICE FOR FLUID DISTRIBUTION VALVES

FIELD OF THE INVENTION

The present invention pertains to fluid (gas and liquid) distribution valves and, more particularly, to a repair device for replacing damaged, rusted or corroded "stops" in buried distribution valves, without the flow therefrom being diverted or interrupted.

BACKGROUND OF THE INVENTION

Over time, many gas and liquid distribution valves designed for buried service in the ground sustain rust and corrosion. Such valves are commercially manufactured by (among others) Homestead of Coraopolis, Pa.; Rockwell Manufacturing Company of Pittsburgh, Pa.; and ACF of Houston, Tex.; bearing model numbers 1376-A, 64667 and 37508, respectively.

Rust and corrosion in these distribution valves often cause the "stops" or, valve limit abutments, to become damaged. At present, the failure of the stops to work properly requires a replacement of the entire valve and/or the fabrication of a diverting channel. This diverting channel entails building jumpers around the old valve and using derbies to circumvent the original flow. The replacement of these valves, or the use of jumpers and derbies, is expensive in both parts and labor and time-consuming. Replacement of the valves often requires that the flow of gas or liquid be interrupted. The disruption of flow to customers and consumers of the gas or liquid commodity is enormously inconvenient and can be quite costly. Either method of valve repair is ultimately unsatisfactory.

The present invention provides a simple, inexpensive way to repair damaged, rusted or corroded stops of distribution valves. It provides a means of quickly repairing the stops of distribution valves, without causing an interruption of the line's gas or liquid flow.

This invention is a retrofit replacement stop device. This device fits over the valve already in place and is affixed to the face thereof by facial guide ribs and a flange adapter extension. The flange adapter extension is bolted to the existing distribution valve flange by stud bolts that fit within the original flange holes of the distribution valve flange.

SUMMARY OF THE INVENTION

In accordance with the present invention, there is provided a retrofit, stop replacement device for the repair of damaged, rusted or corroded stop limits or abutments of distribution valves. The repair device comprises a guide plate that fits over the facial portion of the distribution valve. The guide plate includes an integrally disposed replacement stop for the damaged, rusted or corroded stop abutment. It also comprises two distally-disposed, inverted, U-shaped guide members that are held in place by and disposed respectively over the surface ribs of the distribution valve. Via the inverted, U-shaped guide members, the ribs prevent the guide plate from being twisted when the rotatable valve abutment comes into contact with the stop abutment. The guide plate also includes at least one flange mounting bracket that is an integral part thereof. The flange mounting bracket(s) fit flush upon the respective flanges of the distribution valve. The respective flange mounting brackets are bolted to the distribution valve flanges by hexagonal stud bolts through stud holes that align with the bolt holes in the respective flanges. Affixing the flange mounting brackets to the flange anchors the guide plate securely to the distribution valve.

It is an object of this invention to provide an improved means by which damaged distribution valves can be repaired in situ.

It is another object of the invention to repair damaged distribution valves in the field without interrupting the flow of fluid through the valve.

It is a further object of this invention to provide a simple, cost-effective means by which damaged distribution valves may be repaired.

BRIEF DESCRIPTION OF THE DRAWINGS

A complete understanding of the present invention may be obtained by reference to the accompanying drawings, when considered in conjunction with the subsequent detailed description, in which.

The invention will be better understood and become more apparent hereinafter with reference to the detailed description. For the sake of brevity, like elements and components will bear the same numerical designation throughout the FIGURES.

DESCRIPTION OF THE PREFERRED EMBODIMENT

Generally speaking, distribution valves that are designed for underground usage (burial), often become damaged in their stop abutment sections, due to simple rust and corrosion after having been in the ground for a time. The replacement or repair of these valves has traditionally been a costly and time-consuming proposition, one that often has entailed an interruption in the flow of the gas or liquid commodity. The present invention is a repair device that is easily mounted upon the exposed top surface of the buried valve. This repair device replaces the damaged stop abutment without removing the original distribution valve itself and without interrupting the flow.

Figure 1:
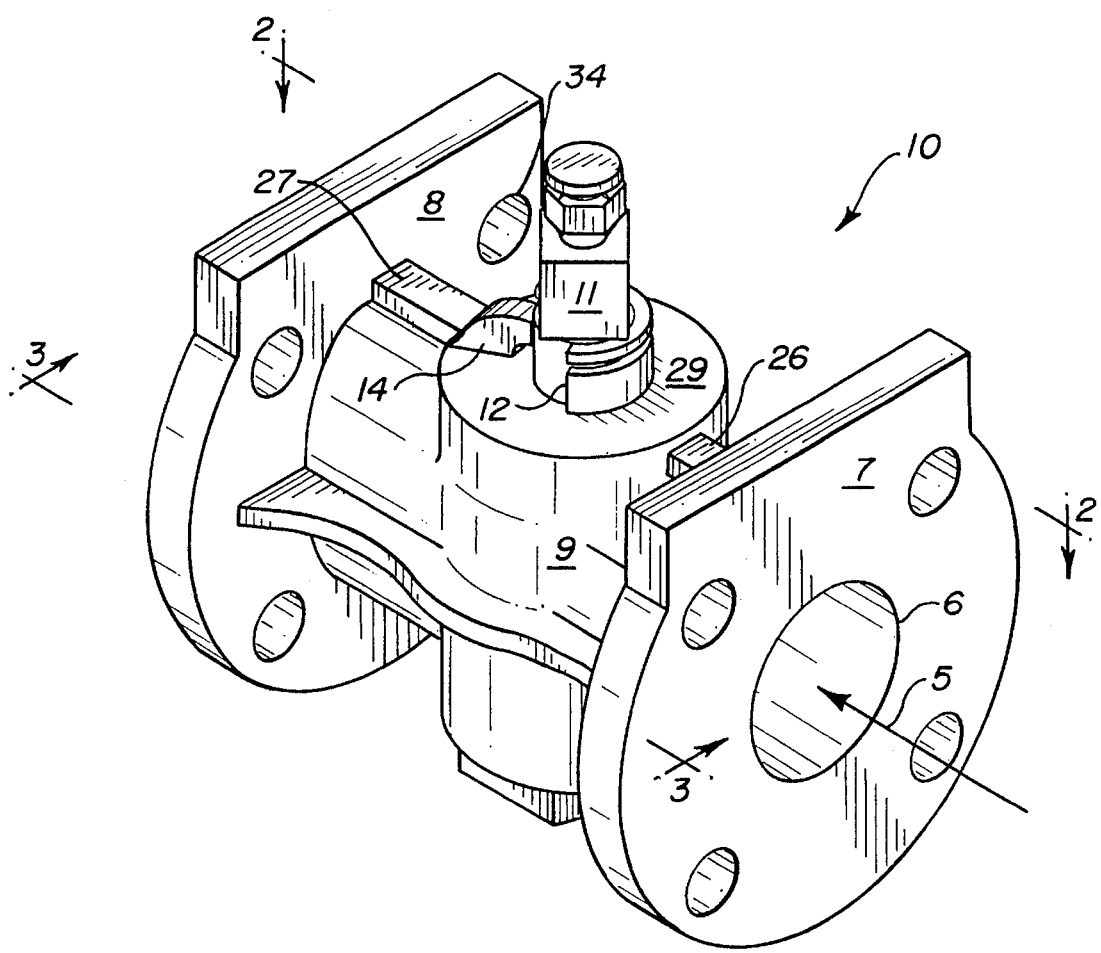
FIG. 1 illustrates a perspective view of a typical distribution valve of the prior art.
Figure 2:
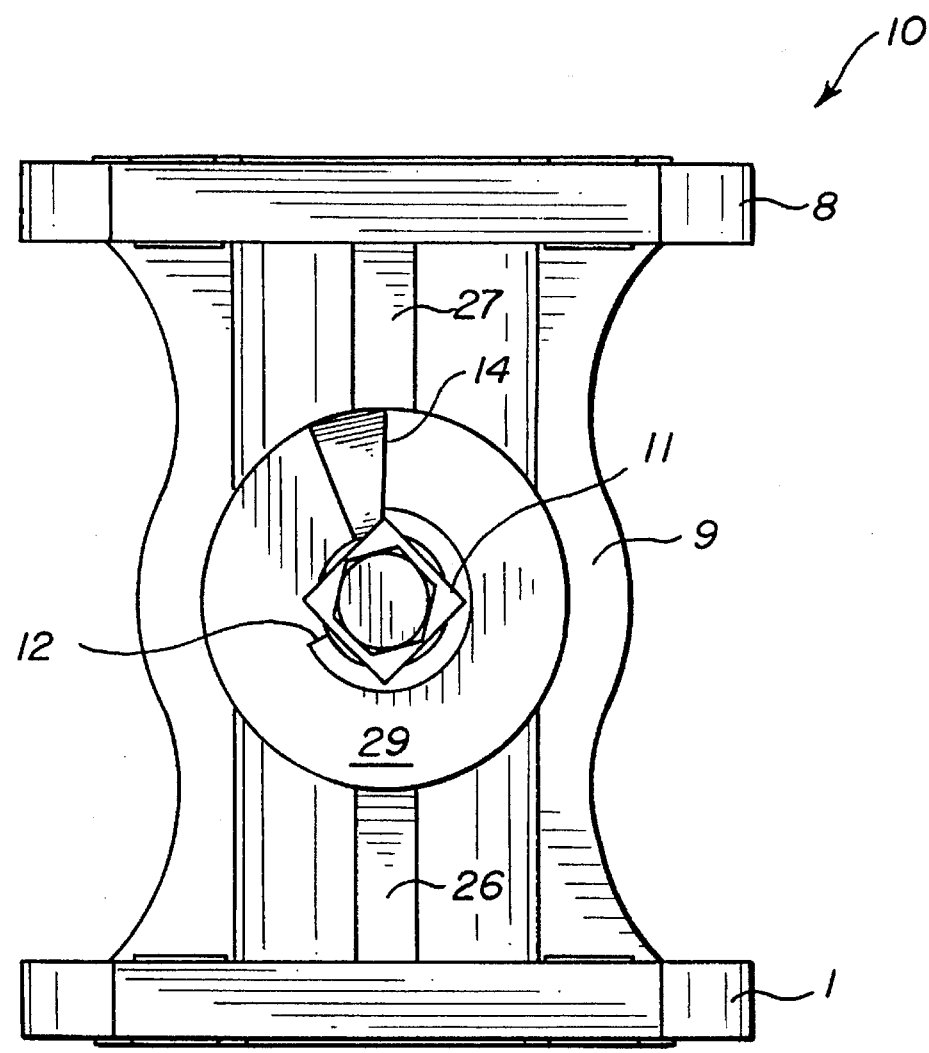
FIG. 2 depicts a plan view of the distribution valve shown in FIG. 1.
Figure 3:
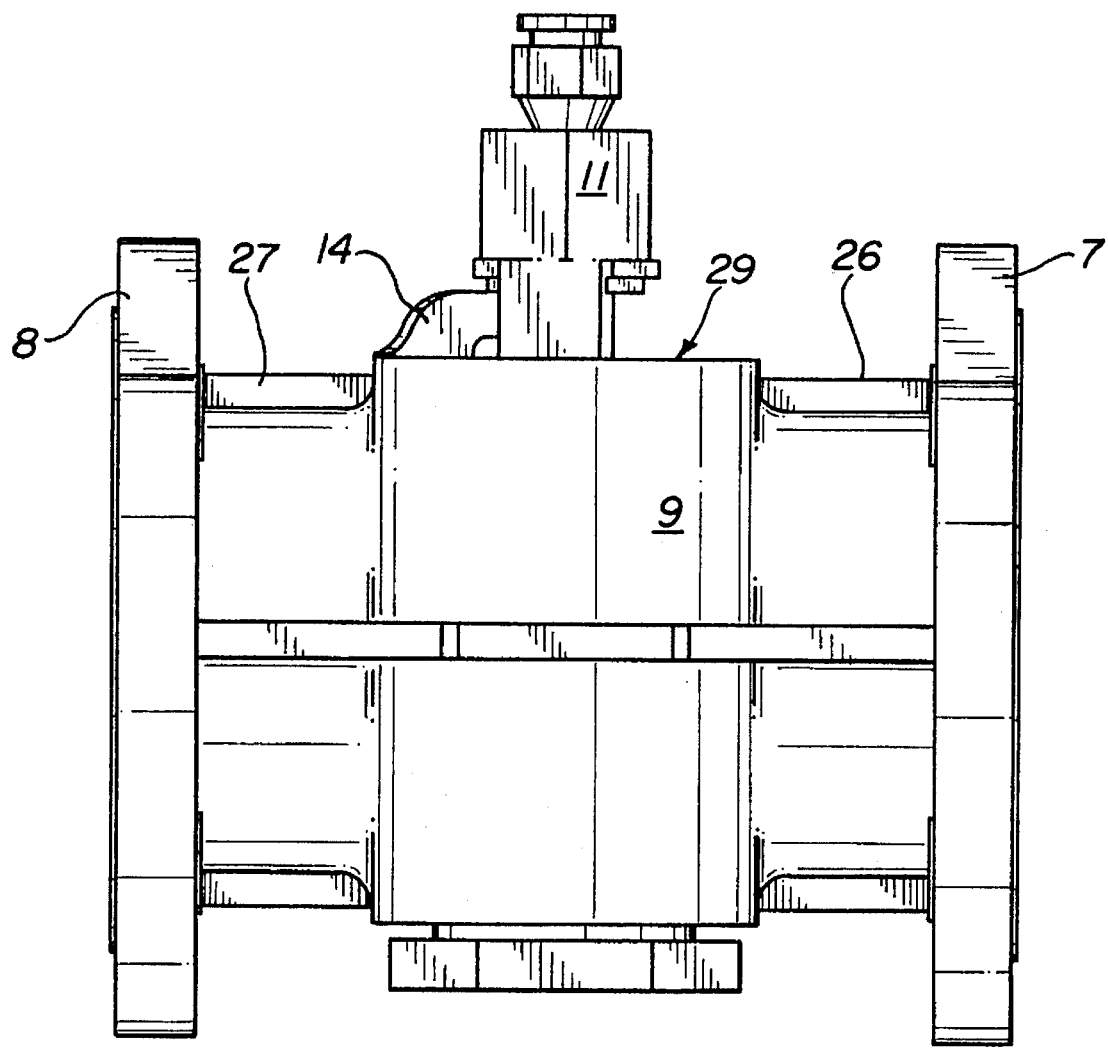
FIG. 3 shows an elevation view of the distribution valve illustrated in FIG. 1.
Figure 4:
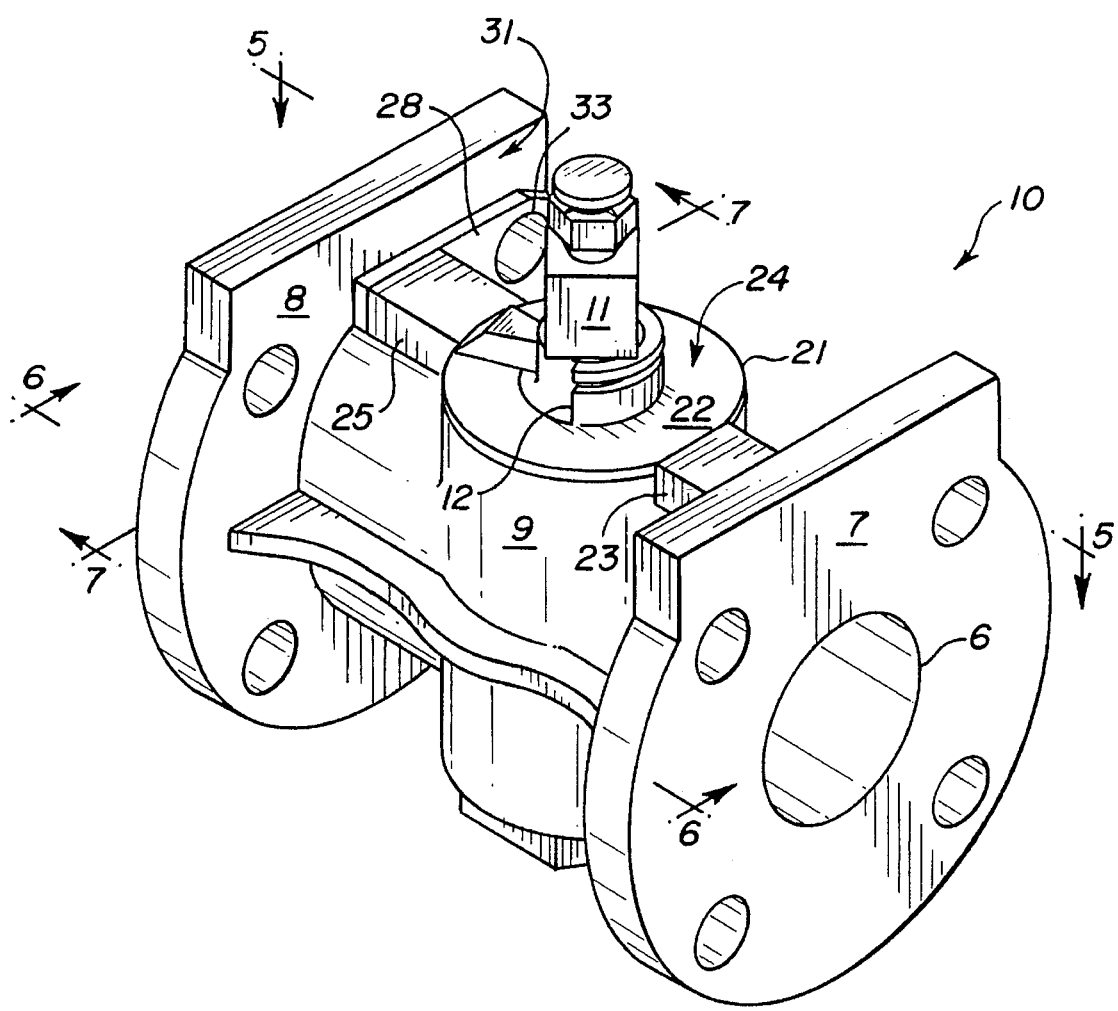
FIG. 4 illustrates a perspective, in situ view of the repair device of this invention disposed over a distribution valve of the type shown in FIG. 1.

Now referring to FIGS. 1 through 3, illustrated is a typical distribution valve 10 to be buried underground and used to dispense gas or liquid. The distribution valve 10 comprises a main body portion 9 and two flange portions 7 and 8, disposed respectively on distal ends of the main body portion 9. The fluid to be dispensed and metered through valve 10 flows (arrow 5) through the bore 6 running, respectively, through the flanges 7 and 8 and the main body portion 9.

The distribution valve 10 is adjusted by an elongated, hand-cranked (hand-rotated) socket wrench (not shown), which comprises a socket that fits over the square-shaped nut 11. The nut 11 is integrally attached to an internal, rotatable plug or slide member (not shown) that restricts the flow. An external contact abutment 12 is attached to the nut 11. The external contact abutment 12 rotatively comes into contact with an external stop or limit abutment 14. This contact defines the limits of the internal plug position (i.e., the fully closed or fully open position of the valve).

As aforementioned, corrosion or rust resulting from ground moisture often damages the external surface parts of buried distribution valves; in particular, the limit stop 14 often becomes damaged, rusted or corroded after many years in the ground. Heretofore, this problem was addressed by completely replacing the distribution valve 10 or by using by-pass flow jumpers and derbies.

Referring to FIGS. 8 through 11, the repair device 20 of the present invention is shown. This device 20 was developed to provide a new way of correcting the aforementioned problem. This invention repairs the existing distribution valve 10 by modifying it with a substitute limit stop abutment 20, as shown in FIGS. 8 through 11. The old, damaged, rusted or corroded stop abutment 14 may be completely worn away or only partially damaged due to rust or corrosion. If portions of the stop still exist on the surface of the distribution valve, they are ground or chiseled off the top surface 29 of the main body portion 9 in order to provide a flush top surface 29 all the way around. With that taken care of, the distribution valve is able to accept the repair device 20 of this invention, along with placement of the guide plate 21. The guide plate 21 has an annular ring 22 that fits flush against the surface 29 of valve 10. (Obviously, where the stop abutment 14 has been completely eaten away, no grinding of top surface 29 may be necessary in order to accommodate annular ring 22.)

As aforementioned, the substitute limit stop device 20 comprises a guide plate 21 comprising an annular ring 22 having a replacement stop abutment 14' integrally disposed on surface 24, as shown. The guide plate 21 also comprises two inverted, U-shaped guide members 23 and 25, respectively, that distally extend from annular ring 22. The guide members 23 and 25 are each placed over the respective surface ribs 26 and 27 that are disposed on the upper portion of the distribution valve 10, as illustrated in FIGS. 4 through 7.

The U-shaped guide members 23 and 25 are held in place against rotative movement by the respective surface ribs 26 and 27. Via the inverted, U-shaped guide members 23 and 25, the ribs 26 and 27 respectively prevent the guide plate 21 from being twisted when the rotatable valve abutment 12 comes into contact with the substitute stop abutment 14'.

Figure 5:
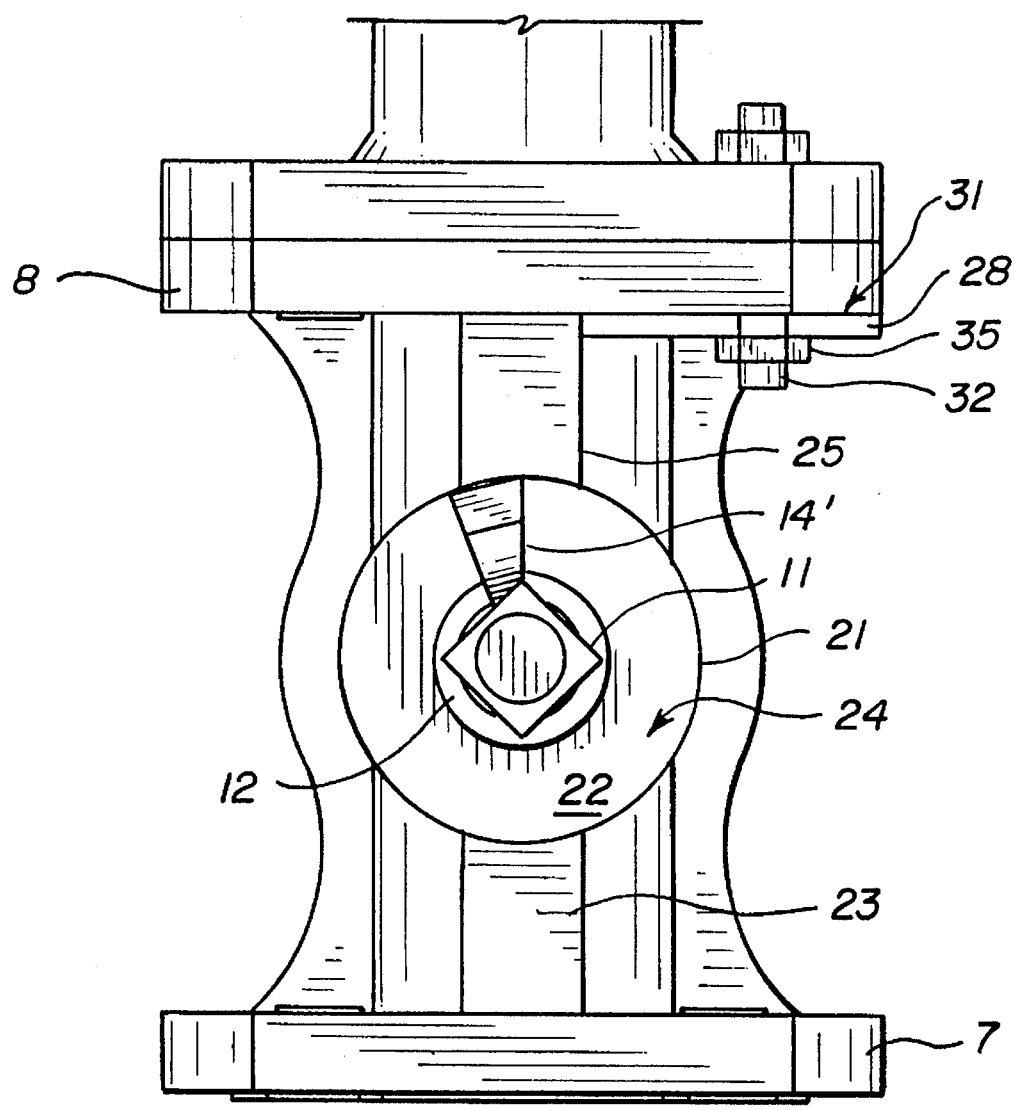
FIG. 5 depicts a top, in situ view of the repair device and distribution valve illustrated in FIG. 4.
Figure 6:
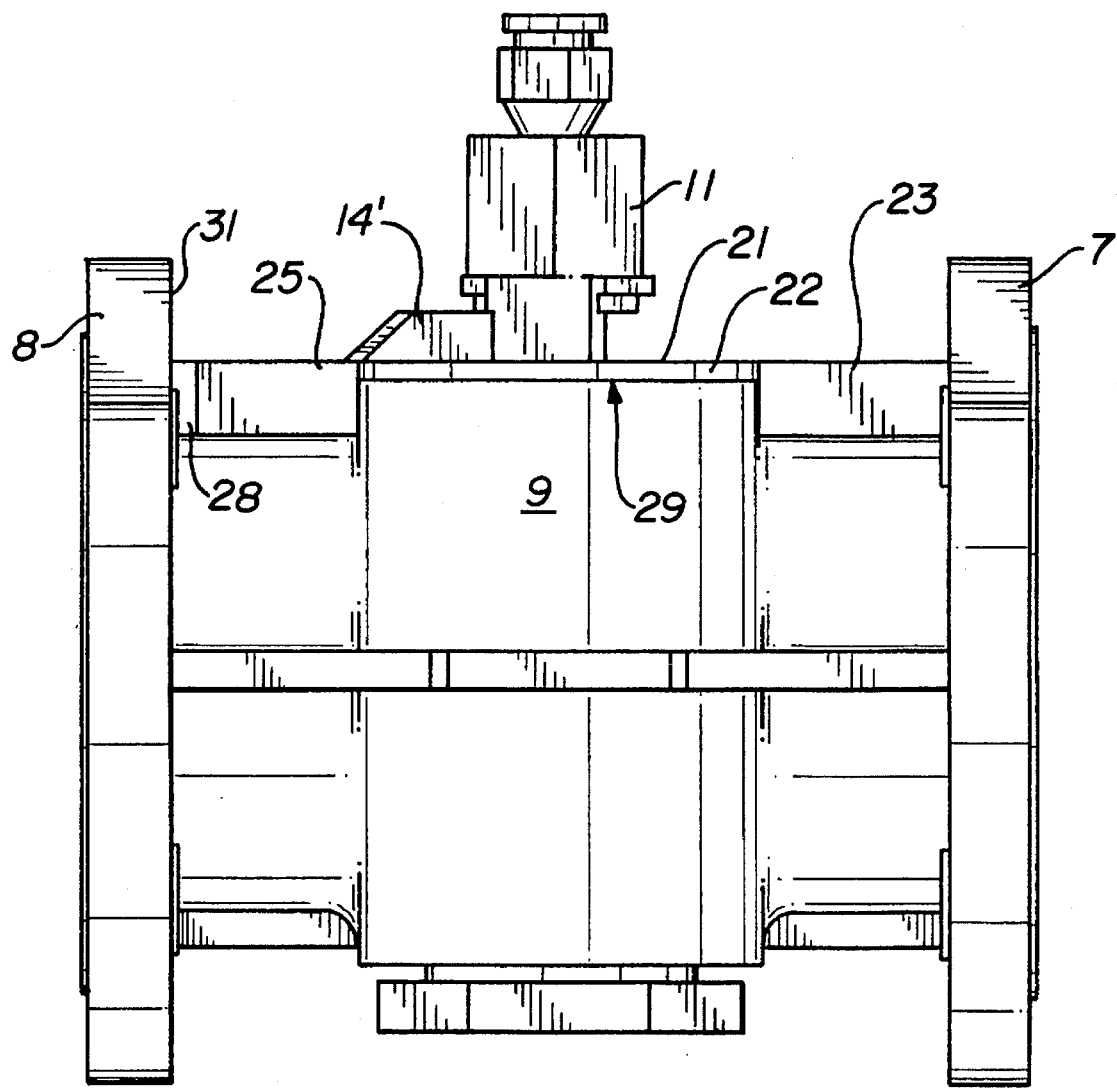
FIG. 6 shows an elevational, in situ view of the repair device and distribution valve depicted in FIG. 4.
Figure 7:
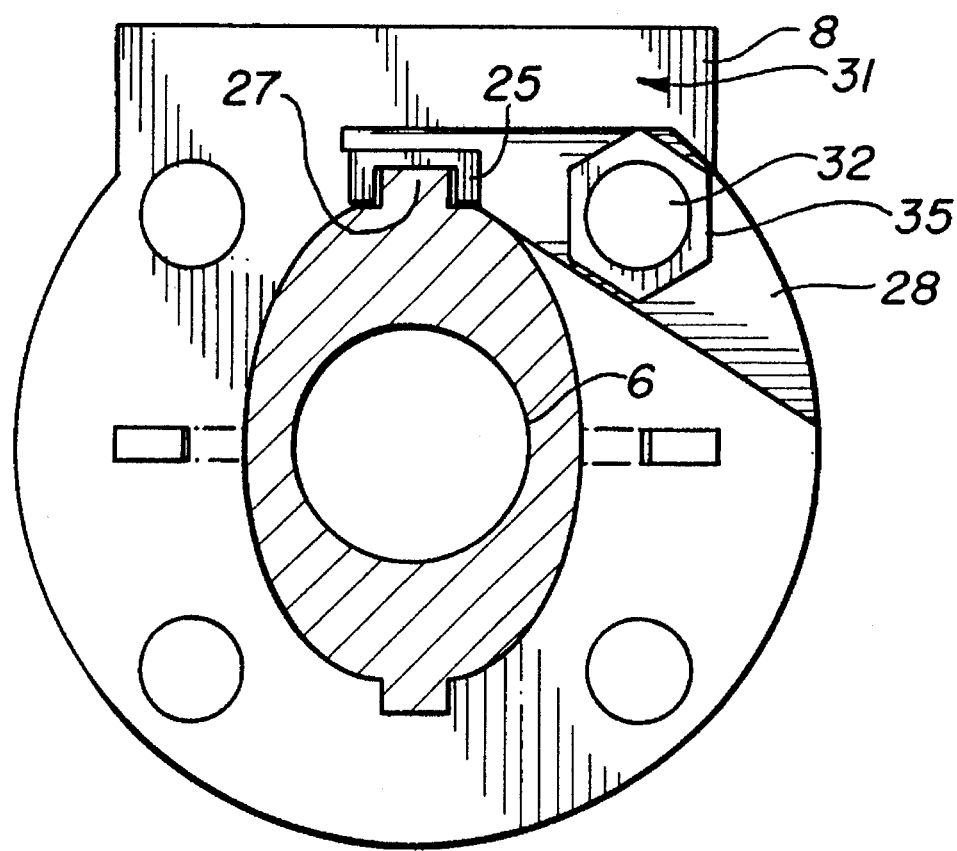
FIG. 7 illustrates a sectional view of FIG. 4 taken along lines 7—7.
Figure 8:
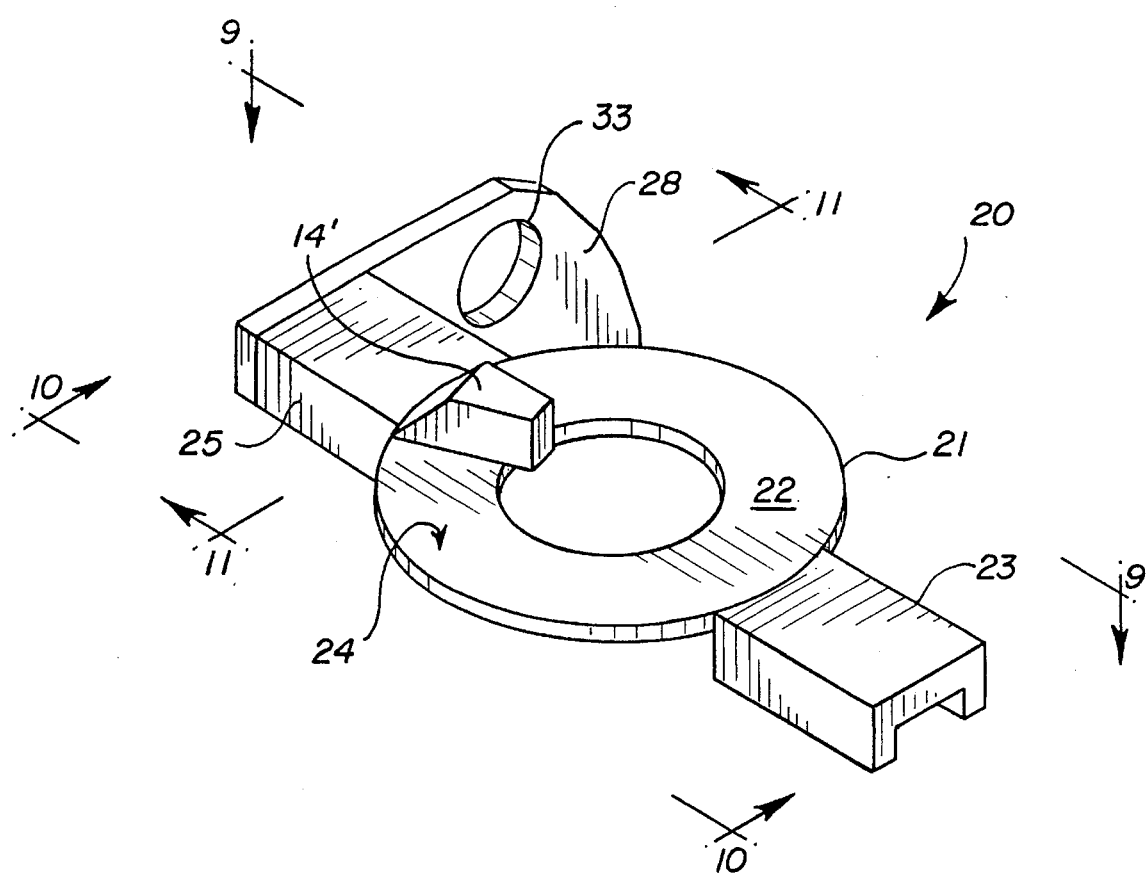
FIG. 8 depicts a perspective view of the repair device of this invention.

Referring again to FIGS. 8 through 11, the guide plate 21 also includes a flange mounting bracket 28 that is an integral part of the guide plate 21 and is attached to the distal end of the inverted, U-shaped rib 25. The flange mounting bracket 28 fits flush upon the surface 31 of the flange portion 8 of the distribution valve 10, as illustrated in FIGS. 4 through 7. The flange mounting bracket 28 is bolted to the flange portion 8 by means of a hexagonal stud bolt 32 and hex nut 35 (FIGS. 5 and 7). The stud bolt 32 extends through stud hole 33, which aligns with the existing bolt hole 34 (FIG. 1) in the respective flange portion 8. Affixing the flange mounting bracket 28 to the flange portion 8 anchors the repair device 20 securely to the distribution valve 10.

Figure 9:
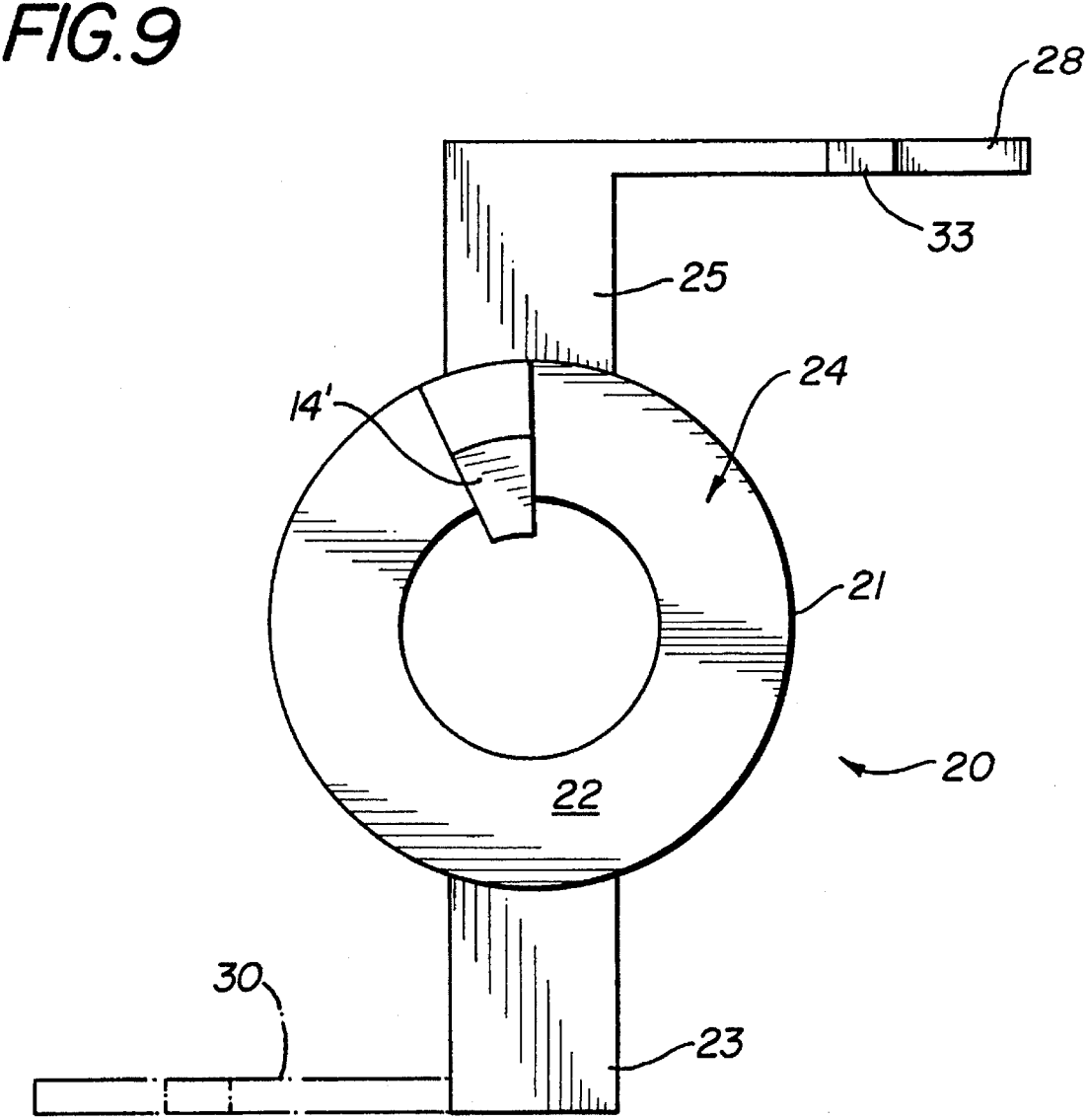
FIG. 9 shows a plan view of the repair device illustrated in FIG. 8, featuring an alternate embodiment of an additional mounting bracket, as shown in phantom.
Figure 10:
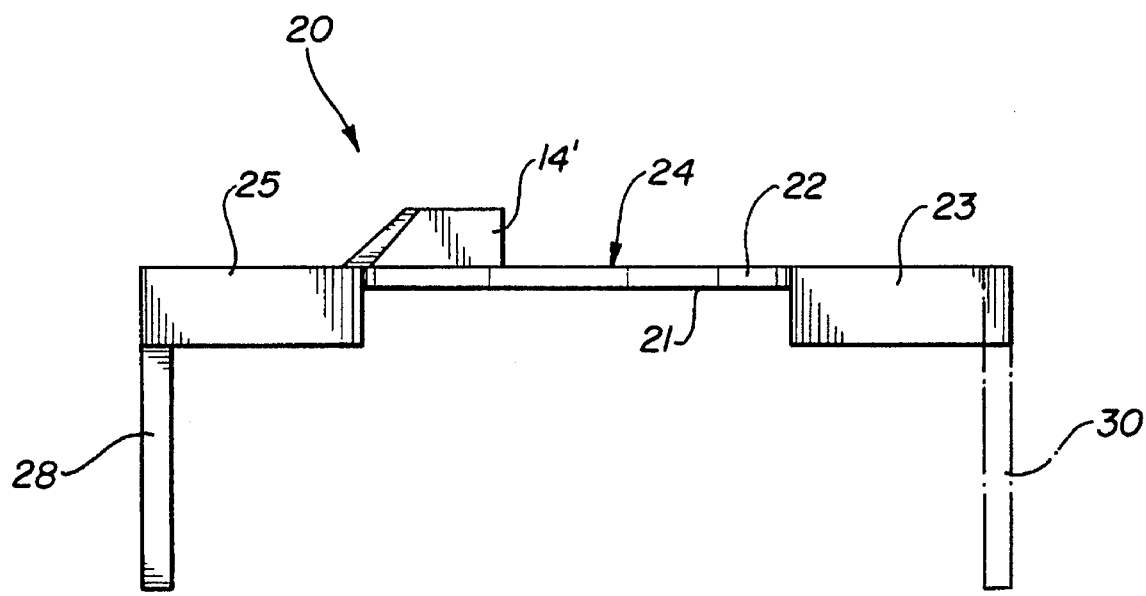
FIG. 10 illustrates an elevational view of the repair device shown in FIG. 8, featuring an alternate embodiment of an additional mounting bracket, as shown in phantom.
Figure 11:
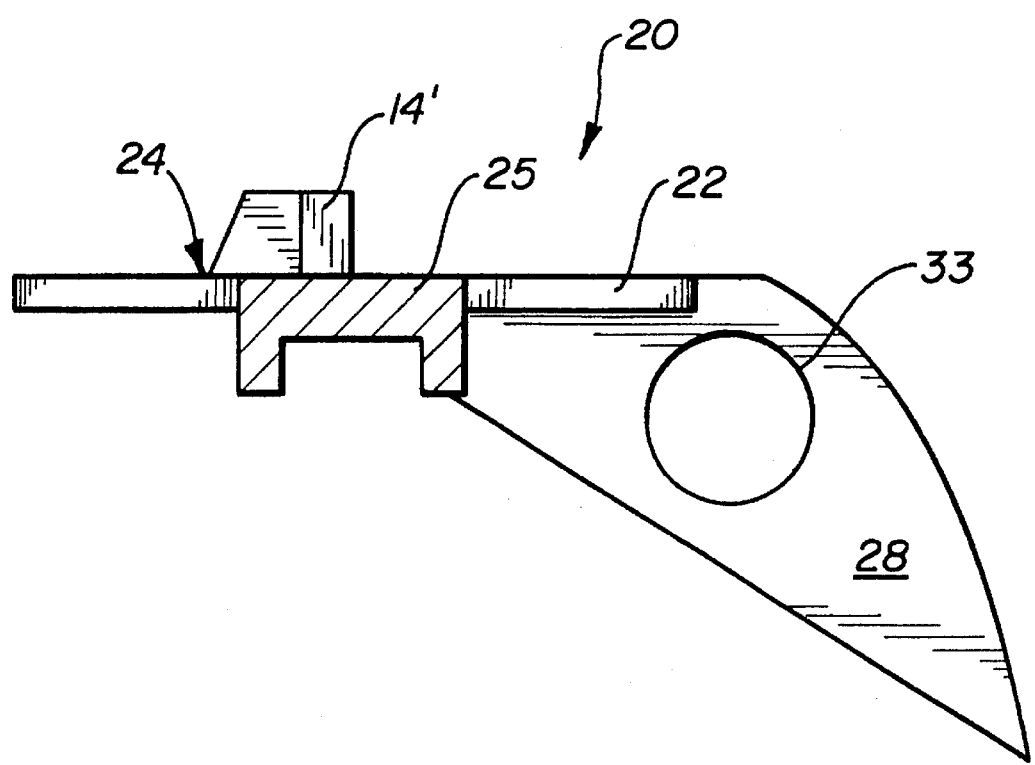
FIG. 11 depicts a sectional view of the repair device illustrated in FIG. 8, taken through lines 11—11.

Referring to FIGS. 9 and 10, an optional or alternate embodiment is shown for the repair device 20. In the alternate form, there are provided two flange mounting brackets 28 and 30, respectively. The use of an additional flange mounting bracket 30 is particularly useful when larger distribution valves are being repaired. The additional flange mounting bracket 30 provides greater support and anchoring for the repair device 20. The second mounting bracket 30 attaches to the flange 7, in a similar fashion as the mounting bracket 28 attaches to flange 8.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A distribution valve repair device, comprising:

a guide plate that fits over a facial and rib portion on a distribution valve, said guide plate including an integrally disposed stop abutment to replace an impaired stop abutment;

guide means disposed on said guide plate for holding said guide plate in place against rotation with respect to said rib portion of said distribution valve and said impaired stop abutment; and at least one flange mounting bracket distally disposed upon said guide plate for securing said guide plate to said distribution valve, said flange mounting bracket fitting substantially flush upon a respective flange portion of the distribution valve.

2. The distribution valve repair device in accordance with claim 1, wherein there are two flange mounting brackets, each of which is respectively mounted to distal end flanges of said distribution valve.

3. The distribution valve repair device in accordance with claim 2, wherein each of the respective flange mounting brackets is bolted to its respective flange portion by means of stud bolts through stud holes that align with bolt holes in the respective flange portion of said distribution valve.

4. The distribution valve repair device in accordance with claim 1, wherein said guide means further comprises two distally-disposed, inverted, substantially U-shaped guide members that are respectively disposed over surface ribs in the distribution valve.

5. The distribution valve repair device in accordance with claim 1, wherein said guide means further comprises an annular ring portion, and wherein said annular ring portion supports said replacement stop abutment.

6. A distribution valve repair device, comprising:

a guide plate that fits over a facial and rib portion on a distribution valve, said guide plate including an integrally disposed stop abutment to replace an impaired stop abutment;

guide means disposed on said guide plate for holding said guide plate in place against rotation with respect to said rib portion of said distribution valve and said impaired stop abutment; and a pair of flange mounting brackets distally disposed apart from each other upon said guide plate for securing said guide plate to said distribution valve, said flange mounting brackets fitting substantially flush upon a respective distal flange portion of the distribution valve.

7. The distribution valve repair device in accordance with claim 6, wherein the pair of respective flange mounting brackets is bolted to its respective flange portion by means of stud bolts through stud holes that align with bolt holes in the respective flange portion of said distribution valve.

8. The distribution valve repair device in accordance with claim 6, wherein said guide means further comprises two distally-disposed, inverted, substantially U-shaped guide members that are respectively disposed over surface ribs in the distribution valve.

9. The distribution valve repair device in accordance with claim 6, wherein said guide means further comprises an annular ring portion, and wherein said annular ring portion supports said replacement stop abutment.

10. A distribution valve repair device, comprising:

a guide plate that fits over a facial and rib portion on a distribution valve, said guide plate including an integrally disposed stop abutment to replace an impaired stop abutment;

guide means disposed on said guide plate for holding said guide plate in place against rotation with respect to said rib portion of said distribution valve and said impaired stop abutment, said guide means including a pair of inverted, substantially U-shaped guide members that are distally disposed with respect to each other and are disposed over surface ribs in the distribution valve; and at least one flange mounting bracket distally disposed upon said guide plate for securing said guide plate to said distribution valve, said flange mounting bracket fitting substantially flush upon a respective flange portion of the distribution valve.

11. The distribution valve repair device in accordance with claim 10, wherein there are two flange mounting brackets, each of which is respectively mounted to distal end flanges of said distribution valve.

12. The distribution valve repair device in accordance with claim 11, wherein each of the respective flange mounting brackets is bolted to its respective flange portion by means of stud bolts through stud holes that align with bolt holes in the respective flange portion of said distribution valve.

13. The distribution valve repair device in accordance with claim 10, wherein said guide means further comprises an annular ring portion, and wherein said annular ring portion supports said replacement stop abutment.

14. A method of repairing a damaged stop abutment on a distribution valve, in situ, said valve having a stop abutment that is impaired, comprising:

a) placing a plate containing a replacement stop abutment over a top surface of said distribution valve and at least partially covering said impaired stop abutment;

b) securing said plate against rotation with respect to said top surface of said distribution valve; and c) anchoring said plate to a surface of said distribution valve.

15. The method of claim 14, further including:

d) removing any portion of an original stop abutment disposed on a surface of said distribution valve prior to the placement of said plate upon said distribution valve in accordance with operation (a).

* * * * *